United States Patent [19]
Jessee

[11] 3,781,634
[45] Dec. 25, 1973

[54] INTEGRATED ERROR VOLTAGE REGULATOR FOR STATIC SWITCHING CIRCUITS

[75] Inventor: Ralph D. Jessee, Lima, Ohio
[73] Assignee: Westinghouse Electric Corporation, Pittsburgh, Pa.
[22] Filed: June 18, 1971
[21] Appl. No.: 154,304

[52] U.S. Cl. ............... 321/9 A, 321/18, 321/45 R, 330/10
[51] Int. Cl. .......................................... H02m 1/12
[58] Field of Search ................... 321/9 A, 9 R, 18, 321/45 R; 330/10; 318/227

[56] References Cited
UNITED STATES PATENTS
3,409,817  11/1968  Gillett .............................. 321/9 A
3,423,663  1/1969  Payne ................................ 321/9 R

FOREIGN PATENTS OR APPLICATIONS
984,567  2/1965  Great Britain ...................... 321/18

Primary Examiner—William H. Beha
Attorney—F. H. Henson et al.

[57] ABSTRACT

The invention pertains to a technique for controlling the switching instants of static switching devices comprising power inverter and converter circuits. The unfiltered voltage output of the power conversion circuit is compared to a constant amplitude A.C. reference voltage waveform to obtain a signal indicative of the instantaneous deviation of the output of the power conversion system from the constant amplitude AC waveform. This signal is then integrated and applied through suitable drive circuit means to control the switching instants of the static switching devices comprising the power conversion system. The switching instant control established by the integrated signal functions to control the switching instants so as to minimize the deviation of the power conversion system output voltage from the constant AC reference voltage. The switching instant control provided by the integrated signal virtually eliminates low order harmonics present in the output voltage of the power conversion system.

4 Claims, 1 Drawing Figure

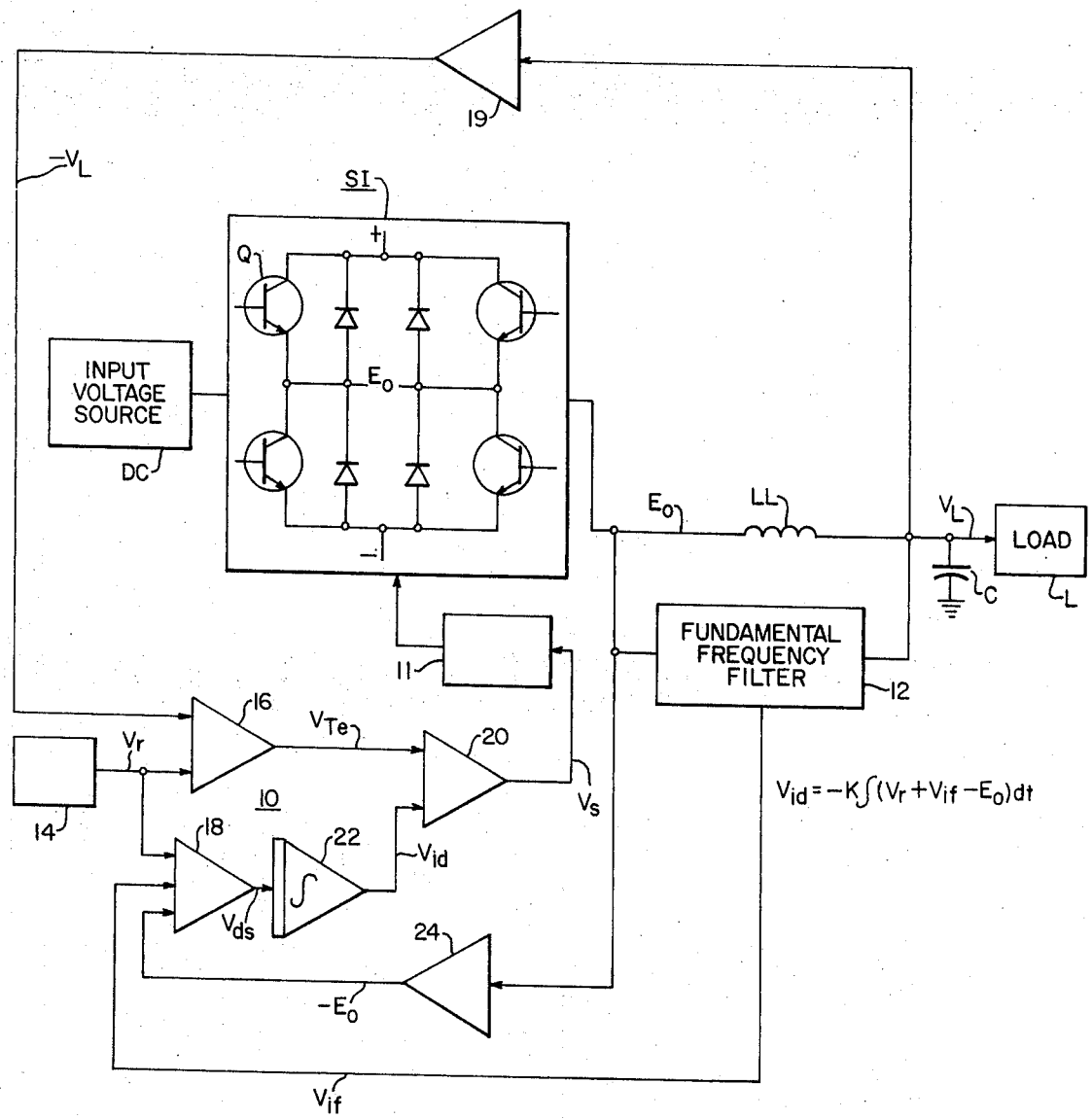

INTEGRATED ERROR VOLTAGE REGULATOR FOR STATIC SWITCHING CIRCUITS

BACKGROUND OF THE INVENTION

Electric power converters, such as inverters, cycloconverters, etc., may be controlled in a variety of ways to produce an alternating output voltage which approximates a sine wave suitable for filtering. A variety of power stage configurations comprised of static switching devices as SCR's, thyristors, etc., are available for manipulating an input voltage source to fabricate the desired output voltage. In most applications it is necessary to control the power conversion system output voltage to a constant value despite changes in source voltage and electrical loads.

A common technique for controlling the switching instants of the static switches comprising the power stage of a power conversion system utilizes a sine wave reference waveform in an effort to establish a switching instant sequence which will result in the generation of the power conversion output waveform approximating the sine wave reference waveform. If the input supply voltage to the power conversion system is a DC voltage the power conversion system is commonly referred to as an inverter; if the input supply voltage is a polyphase AC voltage the power conversion system is generally referred to as a cycloconverter. The output voltage of the power conversion system may be a function of the input voltage as well as the AC reference voltage waveform, depending on the type of switching instant control utilized. In any case the magnitude of the output voltage of the power conversion system is generally controlled by varying the amplitude of the sine wave reference voltage.

SUMMARY OF THE INVENTION

The switching instant control circuit comprising this invention and described in connection with the following specific embodiment develops a signal for controlling the switching instants of the static switches which corresponds to the integral of a signal representing deviation of the unfiltered output voltage of the power conversion system from a constant AC reference voltage. The invention does not rely on the AC reference voltage waveform as the sole controlling influence of the switching instants of the static switches of the power conversion system. Rather the integral of the deviation between the instantaneous value of the unfiltered output of the power conversion system from the constant AC reference voltage provides the control fo the switching instant of the static switches comprising the power conversion system. The unfiltered output of the power conversion system generally exhibits large instantaneous errors which provide a significant deviation signal and thus results in the development of a strong integral control signal. This use of the unfiltered output of the power conversion system in conjunction with the constant AC reference voltage waveform provides for positive switching instant control with a minimum of delay.

DESCRIPTION OF THE DRAWING

The invention will become more readily apparent from the following exemplary description in connection with the accompanying FIGURE which is a block diagram schematic illustration of an embodiment of the invention.

DESCRIPTION OF THE PREFERRED EMBODIMENT

Referring to the drawing there is illustrated schematically in block diagram form the voltage control system 10 operatively connected to switching inverter circuit SI for controlling the switching instants of the static switching devices comprising the switching circuit to develop a desirable inverter output waveform. Numerous switching circuit configurations are available employing static switching devices Q such as thyristor, SCR's, etc. The switching inverter circuit SI responds to firing signals generated by drive circuit 11 in response to control signals $V_s$ by developing voltage output pulses corresponding to voltage levels of the DC input voltage from the DC input voltage source $V_{dc}$ to develop a pulse shape output voltage $E_o$. The output voltage $E_o$ is subsequently filtered by capacitor C and inductor LL to develop a filtered output voltage $V_L$ of a desired magnitude, frequency and wave shape for application to an electrical load L.

The control signal $V_s$ is developed primarily as a function of the integral of the deviation of the unfiltered output voltage $E_o$ from a sine wave reference waveform $V_r$. Additional factors controlling the development of the control signal $V_s$ include a transient error signal $V_{te}$ corresponding to the difference between the filtered output voltage $V_L$ and the sine wave reference voltage $V_r$, and the fundamental component $V_{tf}$ of the voltage drop across the fundamental frequency filter 12.

The since wave reference $V_r$ developed by sine wave reference source 14 is supplied to summing circuits 16 and 18. A second input to the summing circuit 16 is provided by the output of inverter amplifier 19 which corresponds to the filtered output voltage $V_L$. Transient variations in load conditions as reflected in transient changes in the filtered output voltage signal results in the development of the transient error signal $V_{te}$ at the output of the summing circuit 16. The transient error signal $V_{te}$, which corresponds to the differnce between the sine wave reference input $V_r$ and the filtered output voltage input $V_L$, is applied as one input to summing circuit 20. The second input to the summing circuit 20 is developed by the combined operation of the summing circuit 18 and an integrator circuit 22. Summing circuit 18 functions to arithmetically combine the sine wave reference waveform $V_r$, the negative of the unfiltered inverter output voltage $E_o$ as supplied by inverter amplifier circuit 24 and the fundamental component $V_{tf}$ of the voltage drop developed across the fundamental frequency filter 12. The utilization of the unfiltered output voltage $E_o$ reflects large instantaneous errors in the output voltage developed by the switching inverter circuit SI, thus ensuring rapid, positive actuation of the switching devices of the circuit SI by the drive circuit 11 in response to the control signal $V_s$. This instantaneous control of the switching action of the switching inverter circuit SI provides for the development of a pattern of voltage pulses corresponding to the output voltage $E_o$ which closely approximates the sine wave reference waveform $V_r$. Inasmuch as it is normally desired to control the filtered output voltage $V_L$ to a constant value, the addition of the fundamental component $V_{tf}$ of the voltage drop developed across the fundamental frequency filter 12 to the reference voltage waveform $V_r$ in summing circuit 18 provides continuous compensation for the voltage drop across the filter as the voltage drop varies with the load. The combination of the reference waveform $V_r$ modified by the fundamental component $V_{if}$ with the unfiltered output voltage $E_o$ in summing circuit 18 results in an output signal from summing circuit 18 corresponding to what can be termed steady state deviation of the unfiltered output voltage $E_{out}$ from the reference waveform $V_r$. This deviation signal $V_{ds}$ is supplied as an input to integrator circuit 22 which in turn develops an output signal $V_{id}$ which is proportional to the integral with respect to time of the signal $V_{ds}$ and is supplied as the second input to the summing circuit 20. In those applications where transient variations are of no concern the development of the transient error signal $V_{te}$ can be ignored thus rendering the control of the switching action of the switching inverter circuit SI solely in response to the integral of the deviation error signal $V_{ds}$. The switching action developed by the drive circuit 11 in response to the control signal $V_s$ functions to control the switching action in a manner so as to reduce the deviation signal $V_{ds}$ to zero. Thus if the unfiltered output voltage $E_o$ is such as to cause a positive deviation from the reference signal $V_r$, the signal $V_{id}$ of the integrator circuit 22 increases, while in the case of a negative deviation of the unfiltered output signal $E_{out}$ the signal $V_{id}$ decreases. Under zero error signals the integrator output signals $V_{id}$ remains at a constant value until an error condition arises. The continuity of this action results in an integrator operation which maintains the output error of the unfiltered output voltage $E_{out}$ at a minimum with respect to the sine wave reference $V_r$. This operation also provdes for the virutal elmination of low order harmonics. In essence therefore the output of the integrator circuit 22 functions as a reference which controls the switching instants of the switching devices comprising the switching inverter circuit SI. While the voltage developed by the switching inverter circuit SI is limited to discrete values because of the switching action developed by the switching inverter circuit between DC voltage levels, the operation of the integrator circuit 22 functions to maintain the average deviation of the unfiltered output voltage $E_o$ from the reference voltage $V_r$ at zero, hence no d-c component, not present in the reference voltage $V_r$ can be developed in the output voltage $E_o$.

What I claim is:

1. In apparatus for converting input voltage from an input voltage source to a plurality of output voltage pulses in a pattern approximating a desired AC output voltage waveform, the combination of a power stage including a plurality of ON-OFF conduction controlled switching devices operatively coupled between said input voltage source and an electrical load, drive circuit means for actuating said ON-OFF conduction control switching devices to develop a pattern of output voltage pulses corresponding to an unfiltered output voltage waveform of said power stage, control circuit means for controlling the operation of said drive circuit means and including an AC reference voltage source, summing circuit means for developing an output signal proportional to the difference between said AC reference voltage and said unfiltered output voltage of said power stage, and integrator circuit means for integrating said output signal from said summing circuit means and developing an output signal to control said drive circuit means to reduce the fundamental frequency component of said difference to a relatively small constant value, thus maintaining a relatively constant AC output voltage substantially free of low order harmonics.

2. An apparatus as claimed in claim 1 including an output filtering means for developing a filtered AC output voltage, and a fundamental frequency filter for developing an output signal proportional to the fundamental component of the voltage drop across said output filter, said signal being supplied to said summing circuit means to compensate for variation in voltage drop across said output filtering means.

3. In apparatus as claimed in claim 2 wherein said control circuit means include load transient responsive circuit means for monitoring said filtered AC output voltage and modifying said output signal from said means for integrating to compensate for transient variations in electrical load conditions.

4. An apparatus as claimed in claim 1 wherein said AC reference voltage source is a constant sine wave reference voltage source.

* * * * *